United States Patent
Sadoughi-Yarandi et al.

(10) Patent No.: US 9,563,567 B2
(45) Date of Patent: Feb. 7, 2017

(54) SELECTIVE CACHE WAY-GROUP POWER DOWN

(71) Applicant: Apple Inc., Cupertino, CA (US)

(72) Inventors: Mahnaz P Sadoughi-Yarandi, Santa Clara, CA (US); Perumal R. Subramonium, San Jose, CA (US); Brian P. Lilly, San Francisco, CA (US); Hari S Kannan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 14/263,369

(22) Filed: Apr. 28, 2014

(65) Prior Publication Data

US 2015/0309939 A1    Oct. 29, 2015

(51) Int. Cl.
  *G06F 12/08* (2016.01)
(52) U.S. Cl.
  CPC ... *G06F 12/0895* (2013.01); *G06F 2212/1028* (2013.01); *Y02B 60/1225* (2013.01)
(58) Field of Classification Search
  CPC ............ G06F 12/0891; G06F 2212/283; G06F 2212/1028
  See application file for complete search history.

(56) References Cited

U.S. PATENT DOCUMENTS

| | | | |
|---|---|---|---|
| 7,127,560 B2* | 10/2006 | Cohen | G06F 1/3225 707/999.201 |
| 7,873,788 B1* | 1/2011 | Moll | G06F 12/0862 711/118 |
| 8,271,728 B2 | 9/2012 | Strumper et al. | |
| 2012/0173907 A1* | 7/2012 | Moses | G06F 1/3225 713/321 |

* cited by examiner

*Primary Examiner* — Michael Alsip
(74) *Attorney, Agent, or Firm* — Meyertons, Hood, Kivlin, Kowert & Goetzel, P.C.

(57) ABSTRACT

A method and apparatus for selectively powering down a portion of a cache memory includes determining a power down condition dependent upon a number of accesses to the cache memory. In response to the detection of the power down condition, selecting a group of cache ways included in the cache memory dependent upon a number of cache lines in each cache way that are also included in another cache memory. The method further includes locking and flushing the selected group of cache ways, and then activating a low power mode for the selected group of cache ways.

18 Claims, 10 Drawing Sheets

SELECTIVE CACHE WAY-GROUP POWER DOWN

BACKGROUND

Technical Field

This disclosure relates to processor cache operation, and more particularly to cache management mechanisms.

Description of the Related Art

Modern processors use a number of cache memory hierarchies in an effort to expedite data retrieval from main memory. In particular, most all processor cores will have at least a level one (L1) cache that is proximal to the core. In many cases, and especially in multi-core designs, a processor will also have a level two (L2) cache, and in some cases a level three (L3) cache. The L2 and L3 caches are in many cases shared among the various processor cores. The multiple cache hierarchies allow a processing system to keep copies of data that is accessed frequently in the local faster cache memory hierarchy, rather than having to access main memory which is typically slower.

Additional levels of cache memories as well as increased sizes of cache memories have contributed to power consumption in processing systems. In many applications, such as, e.g., mobile computing, additional power consumption may lead to a decrease in battery life. Many processing systems attempt to reduce power consumption by removing power (commonly referred to as "power gating") to unused functional blocks within the system. For example, cache memories may be power gated when processor cores are inactive and not accessing the memories.

SUMMARY OF THE EMBODIMENTS

Various embodiments of a method for selective power down of a portion of a cache memory are disclosed. Broadly speaking, a method and system are contemplated in which circuitry coupled to a cache memory that may be configured to detect a power down condition for the cache memory dependent upon a number of accesses to the cache memory. The cache memory includes a plurality of groups, each group including a plurality of cache ways, and each cache way includes a plurality of cache lines. The circuitry may be further configured to select, in response to the detection of the power down condition, one of the plurality of groups dependent upon a number of cache lines in each cache way in each group that are also included in another cache memory. A flush engine may be configured to flush each cache line of each cache way in the selected group. The circuitry may be further configured to activate a power down mode for the selected group responsive to a determination that the flush of each cache line of each cache way of the plurality of cache ways of the selected group has completed.

In one embodiment, to select one of the groups, the circuitry may be further configured to determine a number of hits for each group. The circuitry may then select one of the groups dependent upon the number of hits for each group.

In another non-limiting embodiment, the flush engine may be further configured to wait a number of processing cycles after issuing a first flush request for a first cache line in a given cache way included in the selected group before issuing a second flush request for a second cache line in the given cache of cache ways included in the selected group.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF THE EMBODIMENTS

Cache memories are often shared among various processors or processing cores to improve computing performance by reducing a need for a given processor or core to retrieve data directly from memory. The addition of various levels of cache memories may, however, increase both dynamic and leakage power consumption. To help remediate the additional power consumption, cache memories are often power gated when not in use by the processors or processing cores.

Conventional power gating, as described above, does not address variation in the utilization of cache memories. In some cases, changes in processing load may result in fewer accesses to a cache memory, resulting in portion of the cache memory being in and idle mode. The embodiments illustrated in the drawings and described below may provide techniques for reducing the size of cache memory be selectively powering down selected groups of ways within the cache memory and thereby reducing leakage power.

Processing System Overview

Figure 1:
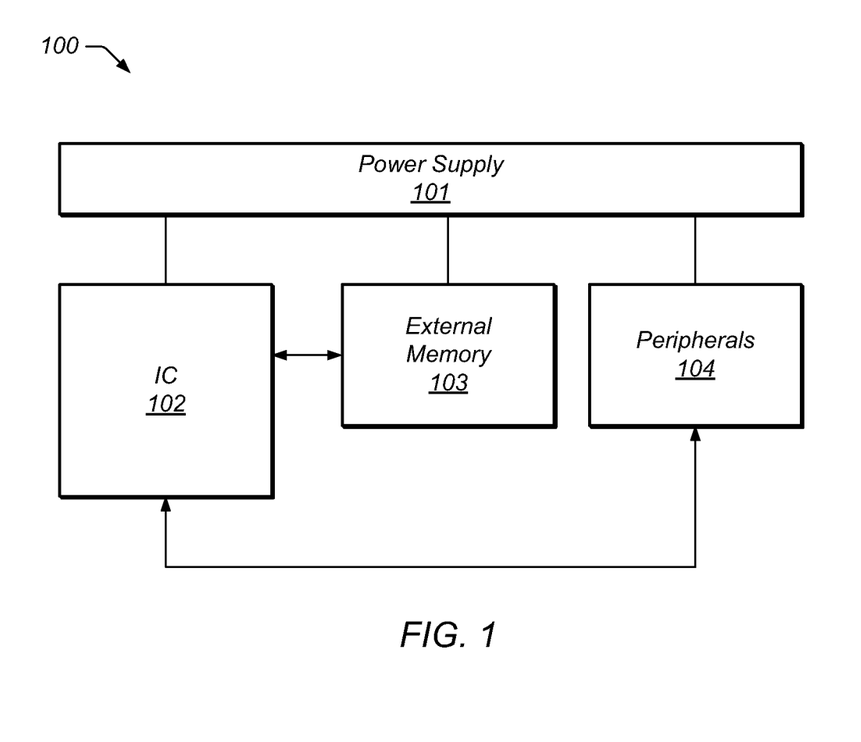
FIG. 1 is a block diagram of an embodiment of a computer system.

A block diagram of one embodiment of a computing system is illustrated in FIG. 1. The system 100 includes an instance of the integrate circuit (IC) 102 coupled to one or more peripherals 104 and an external system memory 103. The system 100 also includes a power supply 101 that may provide one or more supply voltages to the IC 102 as well as one or more supply voltages to the memory 103 and/or the peripherals 104. In some embodiments, more than one instance of the IC 102 may be included.

The peripherals 104 may include any desired circuitry, depending on the type of system. For example, in one embodiment, the system 100 may be included in a mobile device (e.g., personal digital assistant (PDA), smart phone, etc.) and the peripherals 104 may include devices for various types of wireless communication, such as WiFi, Bluetooth, cellular, global positioning system, etc. The peripherals 104 may also include additional storage, including RAM storage, solid-state storage, or disk storage. The peripherals 104 may include user interface devices such as a display screen, including touch display screens or multitouch display screens, keyboard or other input devices, microphones, speakers, etc. In other embodiments, the system 100 may be included in any type of computing system (e.g., desktop personal computer, laptop, tablet, workstation, net top, etc.).

The system memory 103 may include any type of memory. For example, the system memory 103 may be in the DRAM family such as synchronous DRAM (SDRAM), double data rate (DDR, DDR2, DDR3, etc.), or any low power version thereof. System memory 103 may, however, also be implemented in SDRAM, static RAM (SRAM), or other types of RAM, etc.

Figure 2:
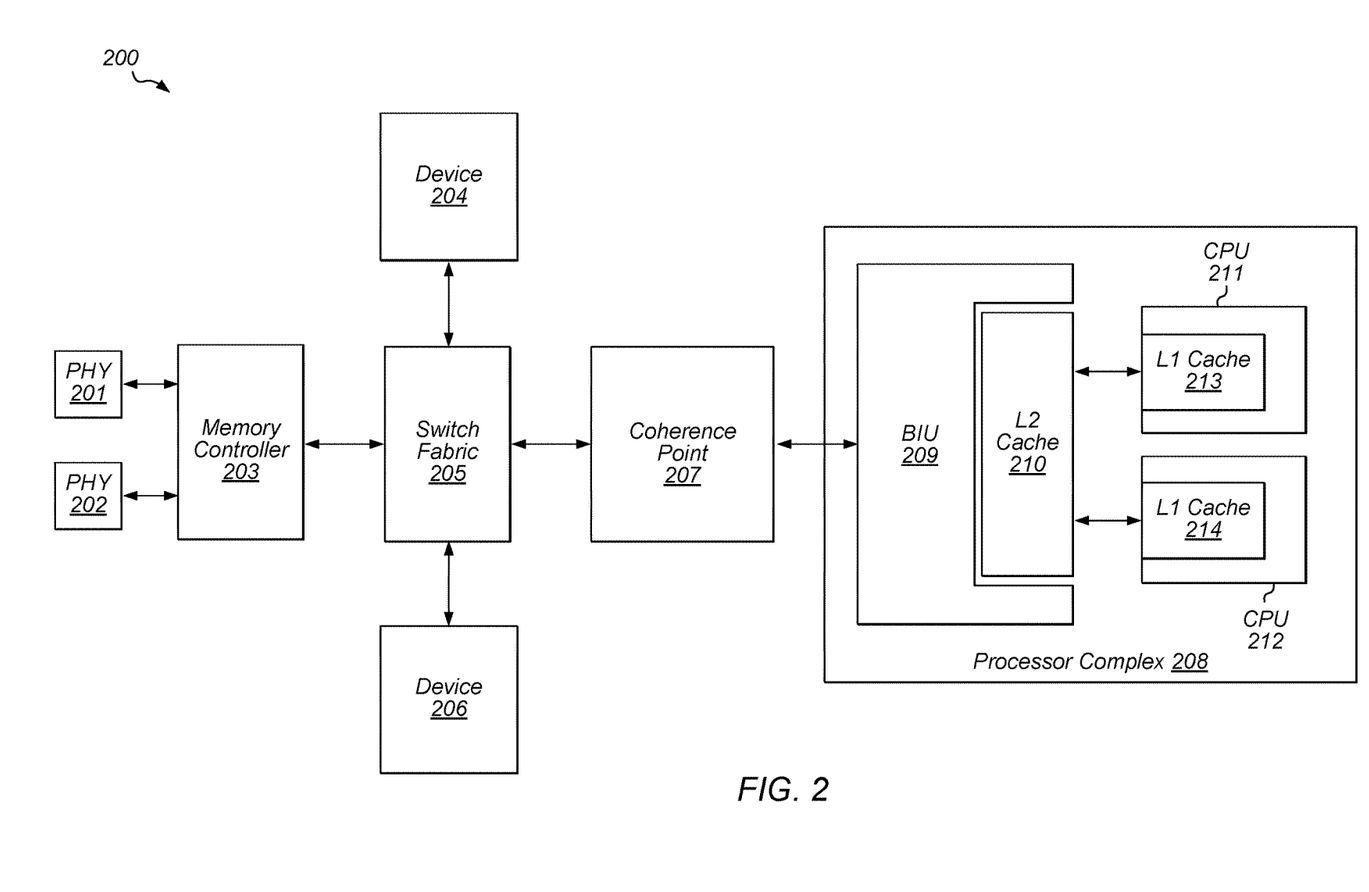
FIG. 2 is a block diagram of an embodiment of an integrated circuit.

Turning now to FIG. 2, a block diagram illustrating one embodiment of a portion of an integrated circuit (IC) is shown. IC 200 may, in various embodiments, correspond to IC 102 as illustrated in FIG. 1. In the illustrated embodiment, IC 200 includes processor complex 208, coherence point 207, switch fabric 205, devices 204 and 206, memory controller 203, and memory physical interface circuits (PHYs) 201 and 202. It is noted that IC 200 may also include many other components not shown in FIG. 1. In various embodiments, IC 200 may also be referred to as a system on chip (SoC), an application specific integrated circuit (ASIC), or an apparatus.

Processor complex 208 may include central processing units (CPUs) 211 and 212, level two (L2) cache 210, and bus interface unit (BIU) 209. In other embodiments, processor complex 208 may include other numbers of CPUs. CPUs 211 and 212 may also be referred to as processors or processor cores. It is noted that processor complex 208 may also include other components not shown in FIG. 2.

The CPUs 211 and 212 may include circuitry to execute instructions defined in an instruction set architecture. Specifically, one or more programs including the instructions may be executed by CPUs 211 and 212. Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

As shown, CPU 211 includes a level one (L1) cache 213 and CPU 212 includes an L1 cache 214, and L1 caches 213 and 214 are coupled to L2 cache 210. Other embodiments may include additional cache levels (e.g., level three (L3) cache). L1 caches 213 and 214 and L2 cache 210 may include any capacity and configuration (e.g. direct mapped, set associative, and the like). L2 cache 210 may be coupled to memory controller 203 via BIU 209, coherence point 207, and switch fabric 205. BIU 209 may include various logic structures to couple CPUs 211 and 212 and L2 cache 210 to various other devices and blocks.

Coherence point 207 may be configured to act as a gateway between the coherent and non-coherent domains in IC 200. Coherence point 207 may be the location in IC 200 where memory operations become globally visible. Coherence point 207 may also include tags from L2 cache 210 for all coherent agents in IC 200 and which may be snooped by coherence point 207 for coherency operations. Coherence point 207 may also include additional logic (e.g., coherence control unit, memory interface unit, current transaction table) not shown in FIG. 2. For example, in various embodiments, coherence point 207 may include cache coherency logic employing a cache coherency protocol to ensure data accessed by each agent is kept up to date. An example of a cache coherency protocol includes the MOESI protocol with the Modified (M), Owned (0), Exclusive (E), Shared (S), and Invalid (I) states. Coherence point 207 may be coupled to switch fabric 205, and coherence point 207 may be coupled to devices 204 and 206 via switch fabric 205. Devices 204 and 206 are representative of any number and type of devices within IC 200. In another embodiment, coherence point 207 and switch fabric 205 may be integrated within a single coherence controller.

Devices 204 and 206 may generally be any type of peripheral device or interface, implementing any hardware functionality included in the system other than the CPUs. For example, the devices 204 and 206 may include video peripherals such as cameras, camera interfaces, image processors, video encoders/decoders, scalers, rotators, blenders, graphics processing units, display controllers, etc. The devices 204 and 206 may include audio peripherals such as microphones, speakers, interfaces to microphones and speakers, audio processors, digital signal processors, mixers, etc. The devices 204 and 206 may include interface controllers for various interfaces external to IC 200, including interfaces such as Universal Serial Bus (USB), peripheral component interconnect (PCI) including PCI Express (PCIe), serial and parallel ports, etc. The devices 204 and 206 may include networking peripherals such as media access controllers (MACs). It is noted that in some embodiments, one or more of devices 204 and 18 may be external to IC 200.

Memory controller 203 may include any number of memory ports and may include circuitry configured to interface to memory. For example, memory controller 203 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), etc. Memory controller 203 may also be coupled to memory physical interface circuits (PHYs) 201 and 202. Memory PHYs 201 and 202 are representative of any number of memory PHYs which may be coupled to memory controller 203. Memory PHYs 201 and 202 may be configured to interface to memory devices (not shown). Memory PHYs 201 and 202 may handle the low-level physical interface to the memory devices. For example, the memory PHYs 201 and 202 may be responsible for the timing of the signals, for proper clocking to synchronous DRAM memory, etc.

It is noted that other embodiments may include other combinations of components, including subsets or supersets of the components shown in FIG. 2 and/or other components. Throughout this detailed description, two or more instances of a given component may be included even if only one is shown, and/or embodiments that include only one instance may be used even if multiple instances are shown. In addition, in other embodiments, the connections between components of IC 200 may differ from those shown with regard to IC 102 as illustrated in FIG. 1.

Cache Memory Overview

Figure 3:
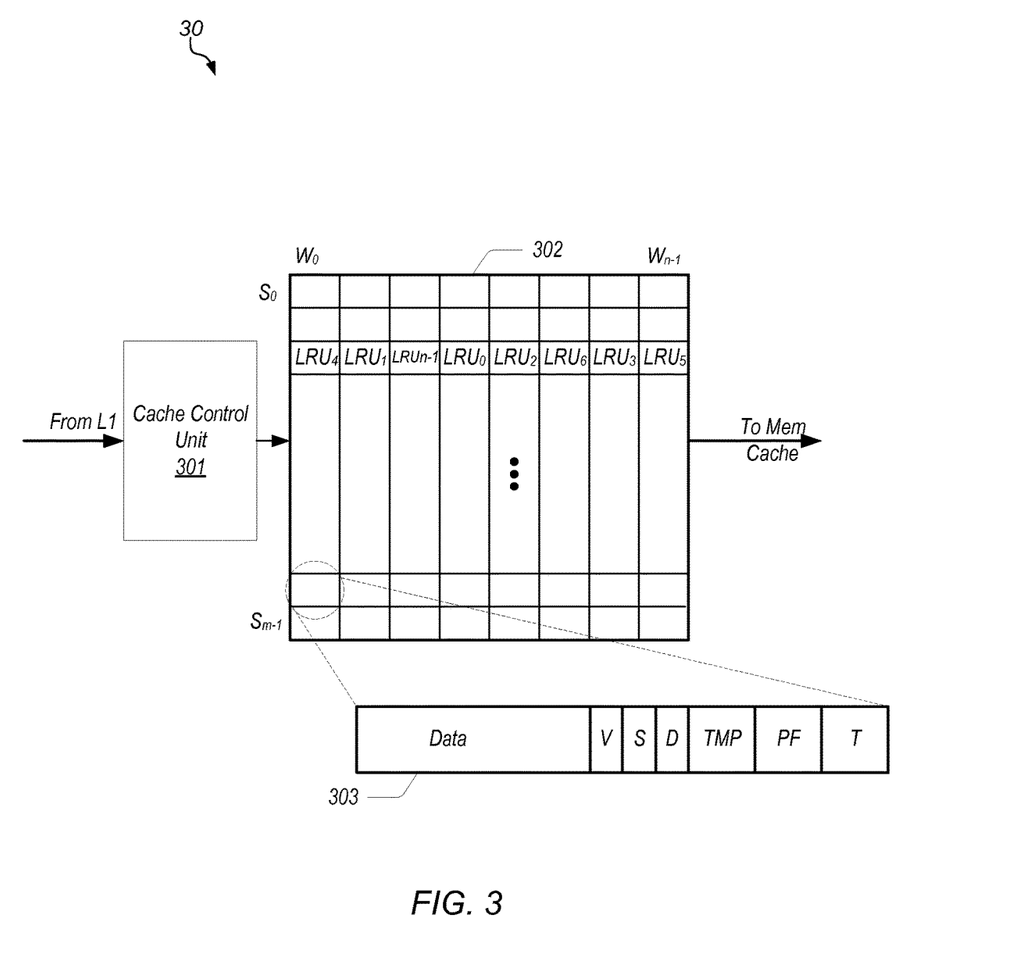
FIG. 3 is a block diagram of depicting aspects of an embodiment of the cache hierarchy.

Referring to FIG. 3, a block diagram of one embodiment of the L2 cache of FIG. 2 is shown. As shown in FIG. 3, the L2 cache 300 includes a cache control unit 301 coupled to a storage array 302. In one embodiment, the L2 cache 300 may be configured as a set associative n-way cache. In the illustrated embodiment, the L2 cache 300 includes n ways, which are labeled $W_0$ through $W_{n-1}$, where n may be any natural number. Similarly, the L2 cache 300 is configured to have m sets, which are labeled $S_0$ through $S_{m-1}$, where m may be any natural number.

In one embodiment, the storage array 302 may be configured to store data in a cache line configuration. It is noted that a cache line may be any number of bytes. A representative cache line 303 is shown in the exploded view of FIG. 3. As shown, the cache line 303 includes storage for data as well as a number of state and indicator bits. More particularly, the cache line 303 includes state bits (e.g., V, S, D), and indicator bits (e.g., TMP bit, PF bit, and T bit).

The state bits may indicate the coherence state of the cache line. In one embodiment, the state bits may include a valid (V), shared (S), and dirty (D) bit. The indicator bits indicate various properties of a cache line. In one embodiment, a memory request may be characterized and so indicated by the TMP bit when it is correlated with other memory requests that occur near to it in time. Because these types of memory requests are correlated, they may have precedence when determining least recently used allocation priorities, as described further below. Thus, the TMP bit is a temporal bit that indicates whether the cache line was stored in the L2 cache 300 as a result of a temporal memory request. In one embodiment, the cache control unit 301 may perform prefetch operations from the system memory into the storage array 302. Accordingly, the PF bit indicates whether the cache line was stored in the L2 cache 300 as a result of a prefetch operation by the cache control unit 301. The PF bit may also be used when a cache line is evicted. More particularly, the cache control unit 301 may use the PF bit to determine whether or not the evicted cache line may be stored to a victim buffer. In one embodiment, prefetched cache lines that were not accessed are not stored to the victim buffer when evicted from the L2 cache 300.

Cache lines from the L2 cache 300 that are stored back to the L1 cache 213 or 214 (i.e., made a trip), may be considered to be used more frequently, and may, therefore, be considered a higher priority in the L2 cache 300. The Trip or T bit indicates that the cache line has been stored in the L1 cache 213 or 214, and was subsequently stored back in the L2 cache 300. Thus, in one embodiment, the T bit may be a sticky bit which is set when a cache line makes more than one trip between the L1 cache 213 or 214 and the L2 cache 300.

The cache control unit 301 may be configured to control storage to and retrieval from the cache storage array 302. In one embodiment, the cache control unit 301 may include logic to determine, allocate, and keep track of the least recently used (LRU) position of cache line entries in the different ways of the cache storage array 302 using a true LRU replacement. The LRU position may be used in determining which cache line is evicted when the cache storage array 302 is full and a new cache line needs to be stored. In one embodiment, each way may be assigned to one of the possible LRU positions, and each set includes all the LRU positions. As shown in the embodiment of FIG. 3, way $W_0$ of an arbitrary set corresponds to $LRU_4$ and way $W_1$ of the same set corresponds to $LRU_1$ and so on up to $LRU_{n-1}$. In this scenario $LRU_0$ represents the least recently used cache line, and the $LRU_{n-1}$ represents the most recently used (MRU) cache line. In other embodiments, different LRU positions may be allocated to different ways of a given set.

Way-Group Power Down

During operation, processors or processing cores may access cache memories for frequently used data. In some cases, however, the requests for frequently used data may be infrequent. When this occurs, portions of the cache memory may not be accessed for numerous processing cycles. By identifying periods of inactivity, it may be possible, in some embodiments, to reduce the size of a cache memory by selectively powering down, i.e., reducing a supply voltage level to ground potential, one or more cache ways. With one or more cache ways powered down, a reduction in leakage power consumption may be achieved in some embodiments.

Figure 4:
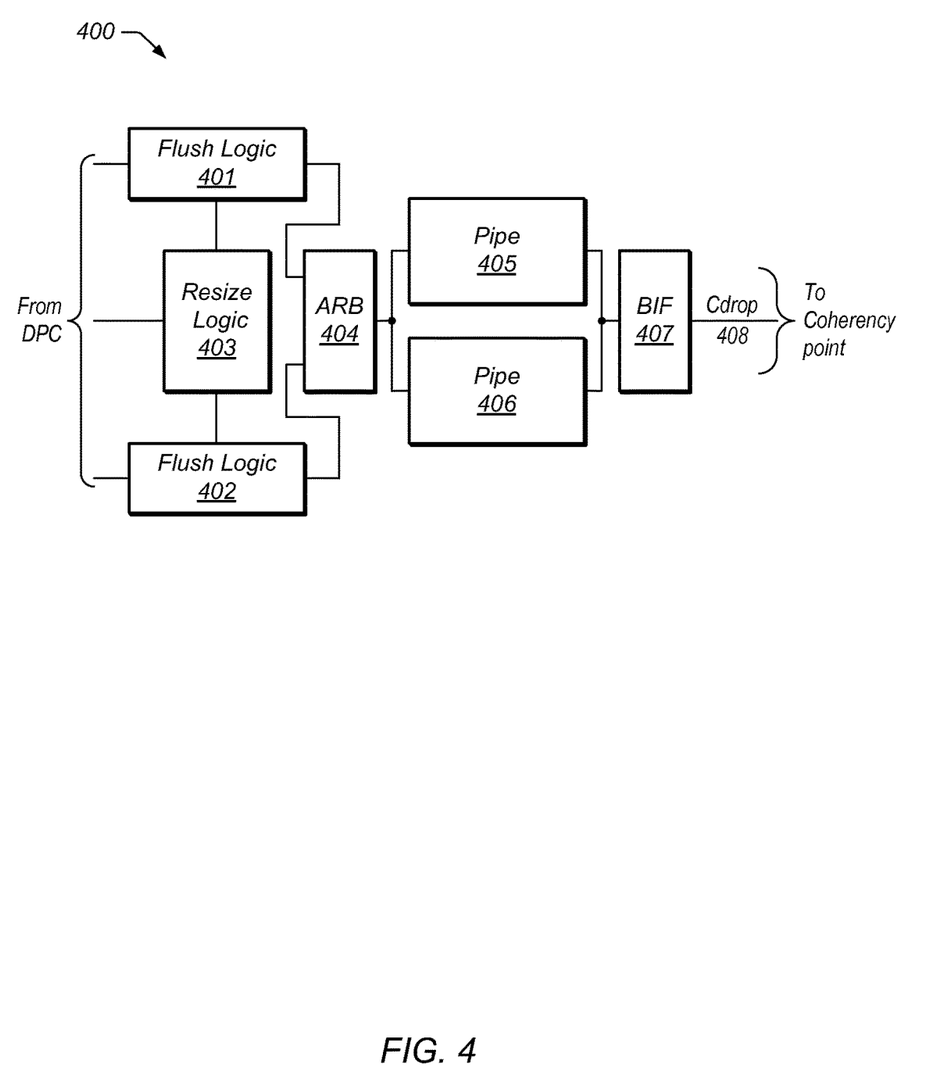
FIG. 4 is a block diagram of an embodiment of a cache flush engine.

Turning to FIG. 4, an embodiment of a flush engine is illustrated. In the illustrated embodiment, flush engine 400 includes flush logic 401 and 402, resize logic 403, arbitration logic (ARB) 404, pipes 405 and 406, and bus interface (BIF) 407. In various embodiments, portions of the flush engine 400 may correspond to flush engine 514 as described below in regard to FIG. 5.

Flush logic 401 and 402 may be configured to receive signals from a power controller and schedule flushes of cache entries accordingly. In some embodiments, each of flush logic 401 and 402 may also receive requests to flush cache entries from respective processors or processing cores. Requests from the power controller as well as processors, as well as from resize logic 403, may be initially arbitrated before being sent to arbitration logic 404.

Resize logic 403 may, in various embodiments, correspond to resize logic 512 as described below in regard to FIG. 5. As described below in more detail, upon detection of a power down event, resize logic may initiate a flush of a selected way-group of a cache memory. In some embodiments, all cache entries in a given way of the selected way-group may be flushed before proceeding to the next way of the selected way-group. Each way may be locked prior to beginning a flush operation to prevent to allocation of new lines into the way. Resize logic 403 may be further configured to throttle the issue of flush requests into the pipes 405 and 406. In some embodiments, flushes due to a power down event may be issued when a queue in arbitration logic 404 is empty, or a flush request may only be issued once every predetermined number of processing cycles. By limiting the number of flush requests that may be issued at any given time, the impact on processor access to the cache memory may, in various embodiments, be reduced.

Arbitration logic 404 may be configured to select which flush request from flush logic 401 and 402 is sent to which pipeline (either pipe 405 or pipe 406). Arbitration logic 404 may employ one of various arbitration algorithms, such as, e.g., round robin, or any other suitable algorithm. Although only two pipelines are shown, in other embodiments, any suitable number of pipelines may be employed.

BIF 407 may be configured to sending requests to and receiving responses from (collectively transactions) memory and other coherent agents. Such transaction may include requests to write data back to memory in response to a flush of a cache way. BIF 407 may in various embodiments, correspond to BIU 209 as illustrated in FIG. 2. In some embodiments, BIF 407 may be configured to communication via one of various protocols, such as what may used in switch fabric, such as, switch fabric 205, for example.

It is noted that the embodiment illustrated in FIG. 4 is merely an example. In other embodiments, different functional blocks and different configurations of functional blocks are possible and contemplated.

Figure 5:
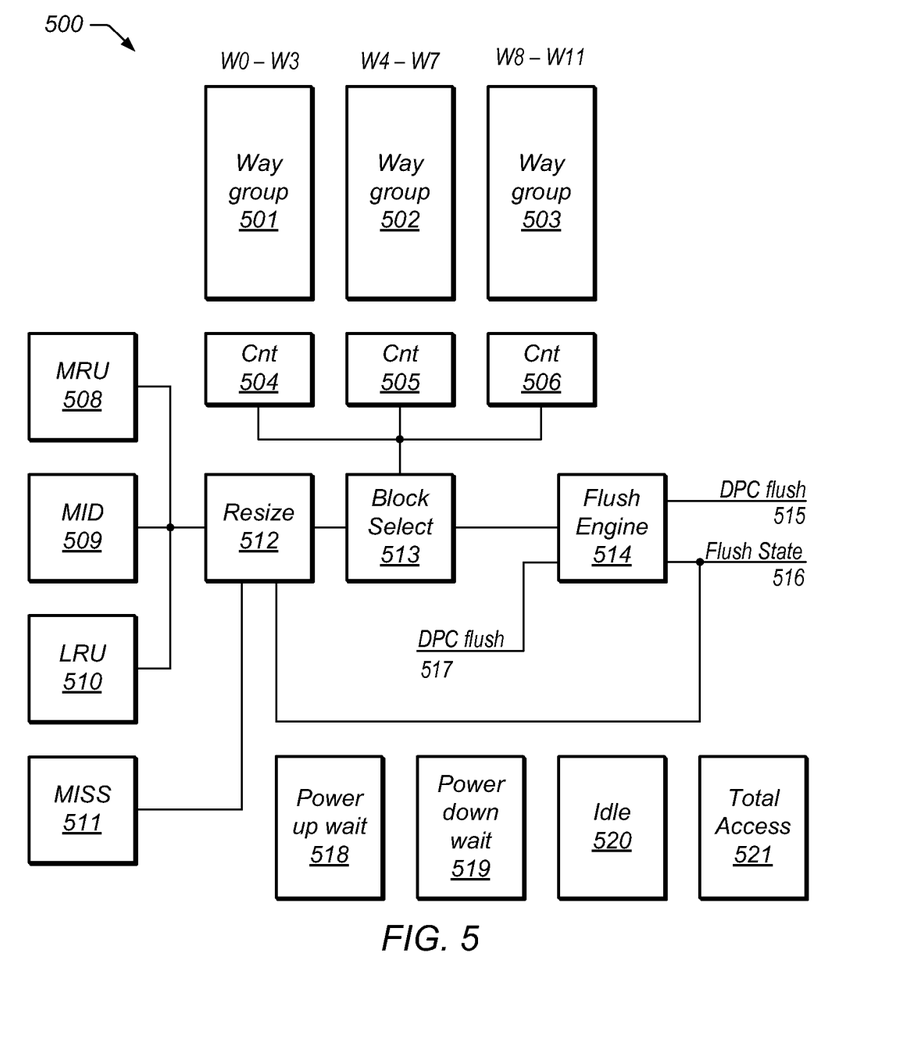
FIG. 5 is a functional block diagram of an embodiment of a cache memory control system.

A functional block diagram depicting an embodiment of a cache system is illustrated in FIG. 5. In the illustrated embodiment, control system 500 includes cache way-groups 501 through 503, counters 504 through 506, LRU position counters 508 through 510, miss counter 511, resize logic 512, block select logic 513, power up wait timer 518, power down wait timer 519, idle timer 520, and flush engine 514. In some embodiments, such a system may be used in conjunction with a cache memory in a computing system, such as, e.g., L2 cache 210 as illustrated in FIG. 2.

Each of way-groups 501 through 503 may include one or more cache ways, such as, e.g., way W0 through Wn−1 as illustrated in FIG. 3. In the illustrated embodiment, way-group 501 includes ways 0 through 4, way-group 502 includes ways 4 through 8, and way-group 503 includes ways 8 through 11. Although three way-groups are depicted in the embodiment illustrated in FIG. 5, any suitable number of way-groups may be employed. Moreover, it is noted that the number of way included within a given way-group is merely an example. In other embodiments, different number of ways per way-group are possible and contemplated.

In order to allow for selective power down of individual way-groups, each of way-groups 501 through 503 may be coupled to a unique internal power supply. The respective internal power supplies of each of way-groups 501 through 503 may be controlled by a dynamic power control (DPC) block, or any suitable power control circuit. The DPC block may reduce a voltage level of an individual way-group's internal supply to a voltage level at or near ground potential. In various embodiments, the DPC block may also provide other voltage levels for the way-groups' internal power supplies to support other modes of operation, such as, e.g., retention mode. In the illustrated embodiment, as many as two way-groups may be powered down, although, in embodiments with different numbers of way-groups, any suitable number of way-groups may be powered down at any given time.

Counters 504 through 506 may perform two functions. Each of counters 504 through 506 are coupled to a respective one of way-groups 501 through 503, and may perform two functions. First, each of counters 504 through 506 may count a number of lines stored in their respective way-group that are also stored in a lower level cache (commonly referred to as inclusive lines). Second, each of counters 504 through 506 may track a number of hits within their respective way-groups. Counters 504 through 506 may also be configured to reset in response to various events, such as, e.g., completion of a way-group power down. Moreover, counters 504 through 506 may be configured to perform a right shift within the counter after a predetermined number of processing cycles. By performing the right shift, counter overflow may be avoided in some embodiments.

Counters as described herein, may be a sequential logic circuit configured to cycle through a pre-determined set of logic states. A counter may include one or more state elements such as, e.g., flip-flop circuits, and may be designed according to one of various designs styles including asynchronous (ripple counters), synchronous counters, ring counters, and the like.

The illustrated embodiment also includes a set of counters to track a number of hits on lowest least recently used (LRU) group positions. The LRU group positions may be divided dependent upon the number of way-groups that are being employed. In the illustrated embodiment, cache lines with LRU values of 0 through 3 belong to LRU-group 0, cache lines with LRU values of 4 through 7 belong to LRU-group 1 (also referred to as MID-group), and cache lines with LRU values of 8 through 11 belong to LRU-group 2 (also referred to as MRU-group). LRU counter 510 tracks a number of hits to cache lines in the LRU-group 0, MID counter 509 tracks a number of hits to cache lines in the MID-group, and MRU counter 508 tracks a number of hits to cache lines in the MRU-group. LRU counter 510, MID counter 509, and MRU counter 508 may also be configured to reset to a predetermined value, as well as performing a right shift after a predetermined number of processing cycles.

The embodiment illustrated in FIG. 5 also includes counters which track information for an entire cache. These counters (also referred to herein as "global counters") include miss counter 511, power up wait timer 518, power down wait timer 519, idle counter 520, and total access counter 521. Miss counter 511 may be configured to increment in response to a cache miss. For example, if one CPU 211 or CPU 212 requests data from L2 cache 210, and L2 cache 210 does not have an entry corresponding to the requested data, miss counter 511 may increment. Miss counter 511 may be further configured to reset to a predetermined value, such as, e.g., zero, in response to various events. For example, once one of cache blocks 501 through 503 is powered down, miss counter 511 may be reset to zero.

Power up timer 518 may be configured to count a number of processing cycles to wait from the detection of a power up condition to the initiation of the power up operation. Power down timer 519 may be configured to count a number of processing cycles to wait from the detection of a power down condition to the initiation of the power down operation. Power up timer 518 and power down timer 519 may also be configured to reset to a predetermined value as well as to perform a right shift after a predetermined number of processing cycles.

Idle counter 520 may be configured to count a number of cycles when no accesses were performed on the cache memory, and total access counter 521 may be configured to count a total number of accesses to the cache memory. As with the previously described counters, idle counter 520 and total access counter 521 may be configured to reset to a predetermined value, and to perform a right shift after a predetermined number of processing cycles.

Resize logic and 512 and block select logic 513 may work together to detect power up and power down conditions, and to select an appropriate way-group to power up or down. As will be described in more detail later, resize logic 512 may use the values of the various counters to determine when the cache memory is not being fully utilized. A wait period may then be initiated once it is determined that cache memory is being underutilized. When the wait period has expired, block select logic 513 may then select a way-group to be powered down. The selection may be a function of the number of inclusive lines in each way-group as well as a number of cache hits within each way-group. Once a way-group has been selected block select logic 513 may then lock the selected way-group so that no new cache lines may be added. The selected way-group may then be flushed by flush engine 514 and, upon completion of the flush, a power controller may be signaled to power down the selected way-group. Resize logic 512 may then reset the various counters to allow monitoring of the utilization of the reduced capacity cache memory. A power event timer, not shown, may also be reset to prevent another power event, either up or down, from happening for a predetermined period of time.

Resize logic 512 may also be configured to determine when additional capacity is needed in the cache memory dependent upon the number of misses that are occurring. In cases where more than one way-group has been previously powered down, block select logic may be configured to select one of the way-group to reactivate. The selection, in some embodiments, may depend on how long each way-group has been powered down. Once the selection has been made, a wait period may be initiated before block select logic signals to a power controller which way-group is to be reactivated. When the selected way-group is powered back on, resize logic 512 and block select logic 513 may then unlock the selected way-group to allow the cache lines in the way-group to become allocated. Resize logic 512 and block select logic 513 may also reset the aforementioned counters to allow for the monitoring of the utilization of the cache memory with the newly reactivated way-group.

Resize logic 512 and block select logic 513 may be designed in accordance with one of various design styles. In some embodiments, a dedicated state machine may be employed while, in other embodiments, a general purpose processor or controller executing program instructions may be used.

In the illustrated embodiment, flush engine 514 may correspond to flush engine 400 as described above in regard to FIG. 4. Flush engine 514 may be configured to schedule writes back to main memory in response a decision to power down a selected one of cache blocks 501 through 503. In some embodiments, flush engine 514 may communicate to main memory through a coherency point or any other suitable logic circuit configured to maintain coherency across multiple cache memories. Flush engine 514 may be further configured to generate DPC flush signal 514 and flush state signal 515 which may be used by a power controller, and system logic, to determine when a flush of a given cache block has completed. In various embodiments, flush engine 514 may also receive DPC flush signal 517 from a power controller to initiate a flush of one or more cache blocks responsive to power down even initiated by the power controller.

It is noted that the embodiment depicted in FIG. 5 is merely an example. In other embodiments, different functional blocks, and different arrangements of functional blocks are possible and contemplated.

Figure 6:
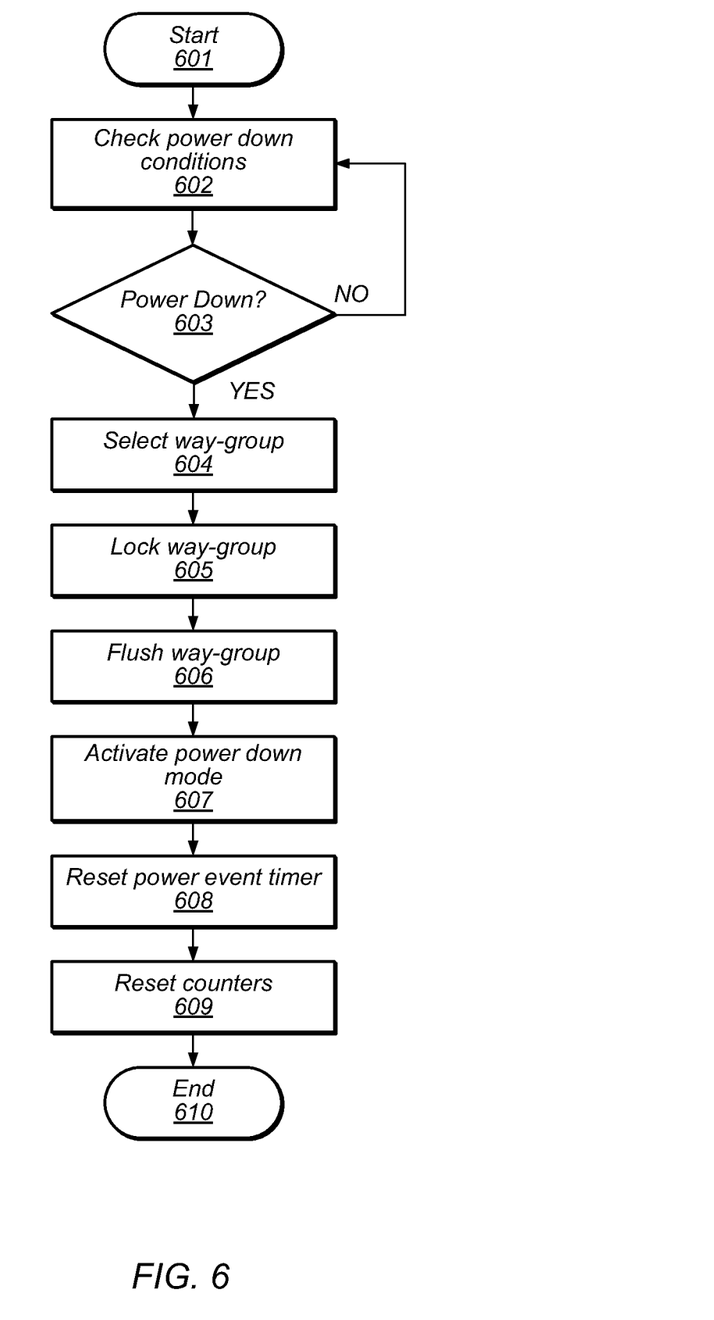
FIG. 6 illustrates a flow diagram of an embodiment of method of powering down a portion of a cache memory.

Turning to FIG. 6, a flowchart depicting an embodiment of a power down method for a cache memory is illustrated. Referring collectively to FIG. 5 and FIG. 6, the method begins in block 601. Conditions that may indicate the need to power down a portion of cache memory 500 may then be evaluated (block 602). In some embodiments, the conditions may include a number of accesses to a cache memory as well as a number of hits to least recently used (LRU) positions with the cache memory. The method may then depend on the state of the conditions (block 603). When the conditions for entering a power down mode are not satisfied, a check on the conditions may again be made, and the method may proceed from block 602 as described above.

If the conditions for entering the power down mode are satisfied, then a way-group may then be selected (block 604). Various selection criteria may be used to select a way-group to be powered down. For example, a number of inclusive lines, i.e., lines that may also be stored in a lower level cache, and a number of hits in each way-group may be employed in the selection of a way-group. In some embodiments, the selection of a way-group may be made after a predetermined period of time has elapsed since the detection of the conditions for entering the power down mode.

Once a way-group has been selected, the selected way group may then be locked (block 605). The lock on the selected way-group may, in various embodiments, prevent new data from filling the selected cache way. With the way-group locked, it may then be flushed (block 606). Data contained in updated, i.e., modified, cache lines must be written back to main memory. Writes to memory may then be scheduled by a flush engine, such as, e.g., flush engine 400 as illustrated in FIG. 4, and sent to a coherency point for further processing. In some embodiments, each cache line within a given cache line may be checked to determine if a write back to memory is needed, and if so, issue the necessary flush request. Once all cache lines within a given cache way are processed, cache lines of another cache way in the selected way-group may then be processed.

With the flush of the selected way-group complete, a power down mode for the selected way-group may then be activated (block 607). In some embodiments, a single may be sent to a power controller indicating which way-group of the cache memory has been selected for power down. The power controller may then reduce a voltage level on a power supply to the selected way-group. Complementary metal-oxide semiconductor field-effect transistors (MOSFETs) may be employed, in various embodiments, as switches to isolate the power supply to the selected way-group, thereby allowing the power supply to discharge to ground potential.

Once the selected way-group has been powered down, a power event timer may be reset (block 608). By resetting the power event timer, a processing system may, in various embodiments, prevent another power event, such as powering down another way-group, from occurring for a predetermined period of time, thereby preventing the consumption of additional power due to frequent transitions between power states within the cache memory.

Additional counters used to monitor utilization of the cache memory may then be reset (block 609). The additional counter may include, for example, counters 504 through 506, miss counter 511, and the like. The counters may be reset to zero, or any other suitable value. With the counters reset, the method may conclude in block 610.

It is noted that the method depicted in the flowchart of FIG. 6 is merely an example. In other embodiments, different operations, and different orders of operations are possible and contemplated.

Figure 7:
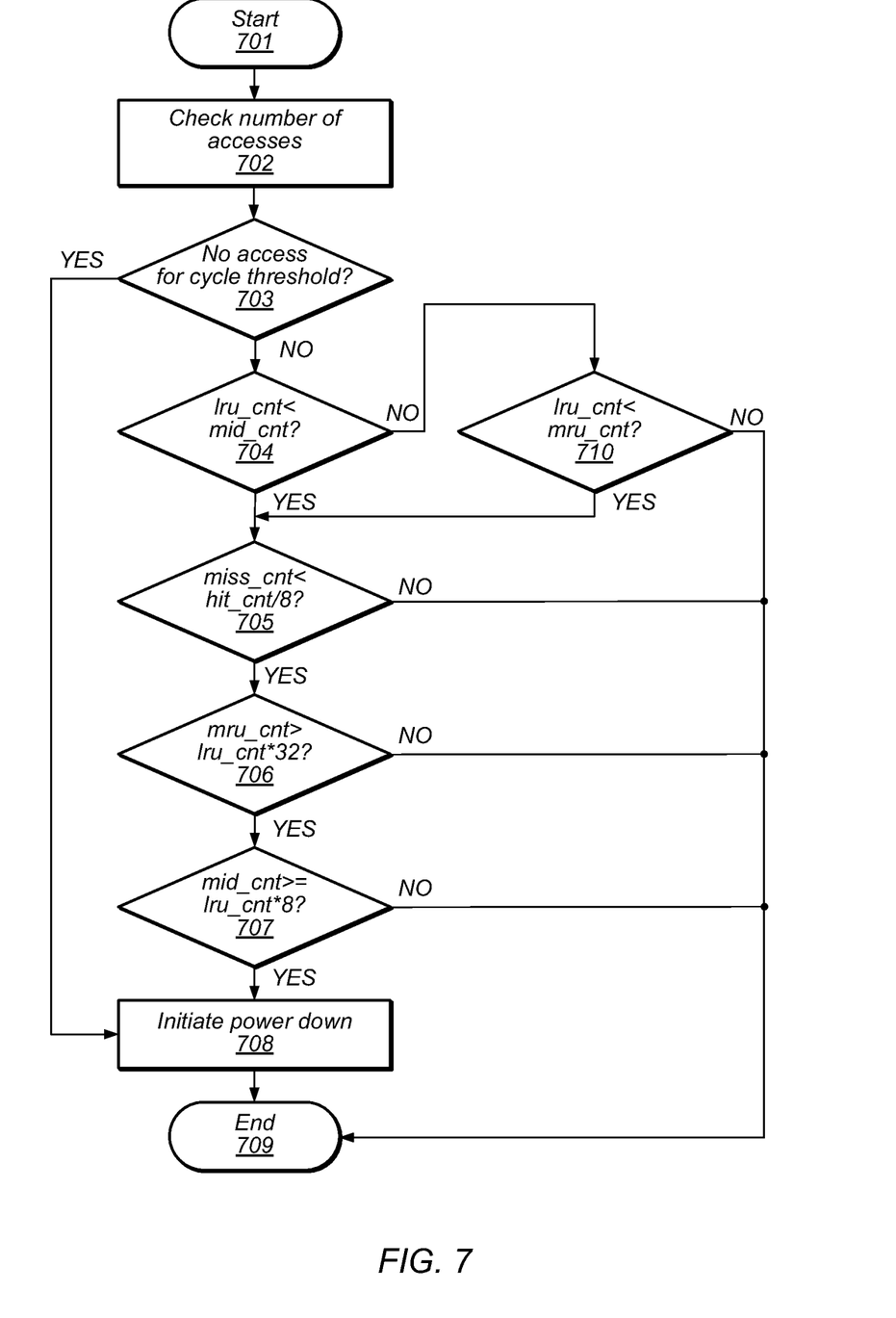
FIG. 7 illustrates a flow diagram of an embodiment of a method for detecting a power down condition for a cache memory.

A flowchart depicting an embodiment of a method for checking power down conditions is illustrated in FIG. 7. Referring collectively to FIG. 5 and the flowchart of FIG. 7, the method begins in block 701. A number of accesses to a cache memory may then be checked (block 702). In some embodiments, a counter or other sequential logic circuit may track the number of times a cache memory, such as, e.g., L2 cache 210, is accessed. Each access, whether the access results in a hit or miss, may result in the counter to increment.

The method may then depend on the number of accesses (block 703). If there are no accesses for a cycle threshold, then a power down of a way-group may be initiated (block 708). In various embodiments, the number of cycle threshold, i.e., the number of cycles that can occur without a cache memory access may be adjusted dependent upon the processing and power requirements of a computing system. With the initiation of the way-group power down, the method concludes in block 709.

If an access has occurred during the cycle threshold period, then the method may depend on a number of hits to different least recently used positions (block 704). If the value of the LRU counter 510 is less than the value of counter 509, then the method may depend on a number of misses and a number of hits (block 705). If the value of MISS counter 511 is greater than or equal to a total number of hits divided by eight, then the method may conclude in block 709. If the value of MISS counter 511 is less than the total number of hits divided by eight, then the method may depend on the value of MRU counter 508 and LRU counter 510 (block 706). It is noted that while the hit count is scaled by a factor of eight, in other embodiments, different scaling factors, including no scaling, may be employed.

If the value of MRU counter 508 is less than or equal to the value of LRU counter 510 multiplied by 32, then the method may conclude in block 709. If the value of MRU counter 508 is greater than the value of LRU counter 510 multiplied by 32, then the method may depend on the value of MID counter 509 and LRU counter 510 (block 707). It is noted that although the value of LRU counter 510 is scaled by 32, it other embodiments, different scaling of either the value of LRU counter 510 or MRU counter 508 are possible and contemplated.

If the value of MID counter 509 is less than the value of LRU counter 510 multiplied by eight, then the method may conclude in block 709. If the value of MID counter 509 is greater than or equal to the value of LRU counter 510 multiplied by eight, then the method may proceed from block 708 as described above. It is noted that the relationship between the values of MID counter 509 and LRU counter 510 is merely an example. In other embodiments, different relationships and scaling may be employed.

Returning to block 704, if the value of LRU counter 510 is greater than or equal to the value of MID counter 509, then the method may depend on the values of LRU counter 510 and MRU counter 508 (block 710). If the value of LRU counter 510 is less than the value of MRU counter 508, then method may then proceed from block 705 as described above. Alternatively, if the value of LRU counter 510 is greater than or equal to the value of MRU counter 508, then the method may conclude in block 709.

The method depicted in the flowchart illustrated in FIG. 7 is merely one example of a method to monitor a pattern of accesses to a cache memory. In other embodiments, different comparisons between hits, misses, and accesses to least recently used positions in the cache are possible and contemplated. Such other comparisons may employ different operations, and may perform one or more operations in parallel.

Figure 8:
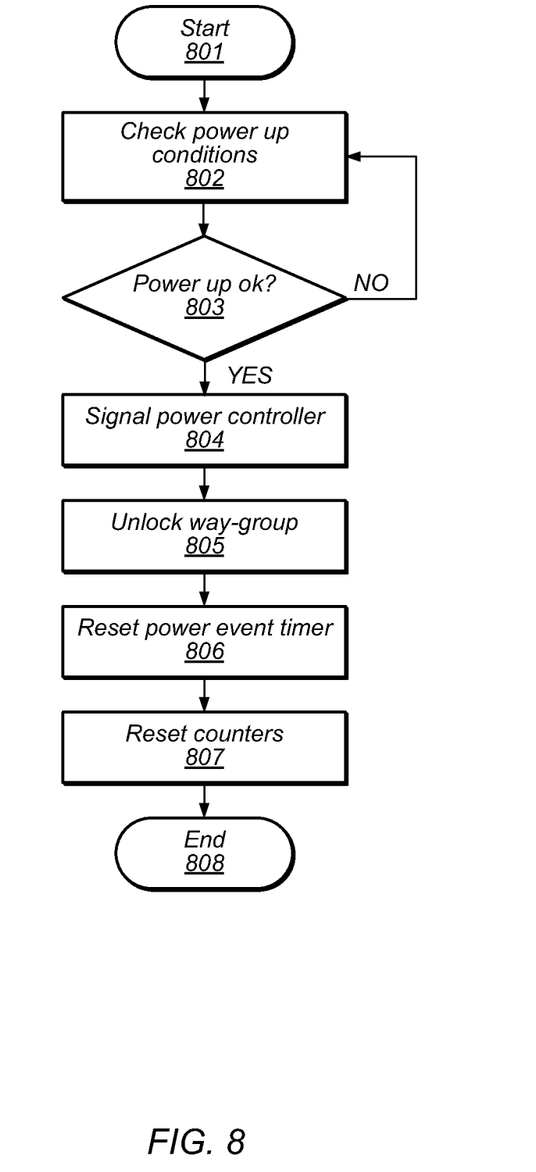
FIG. 8 illustrates a flow diagram of an embodiment of a method for powering up a portion of a cache memory.

Turning to FIG. 8, a flowchart depicting an embodiment of a method for powering up a portion of a cache memory is illustrated. The method begins in block 801. Power up conditions may then be checked (block 802). In various embodiments, a logic circuit such as, e.g., resize block 512 as illustrated in FIG. 5, may track a number of access to a cache memory that result in misses, and use the tracked number of misses to determine conditions requiring activation of a way-group which has been previously powered down.

The method may then depend on the value of the power up conditions (block 803). When the conditions do not indicate that additional cache storage capacity is needed, i.e., the performance of the system is still adequate, the method continues from block 801 as described above.

When the power up conditions indicate that additional storage capacity in the cache is needed, a power controller unit may then be notified to return power to a previously powered down way-group (block 804). In some embodiments, the power controller may close one or more power switches re-coupling the previously powered down way-group to a power supply signal. The power controller may, in various embodiments, wait a period of time or monitor a voltage level of the power supply signal to ensure that regulator circuits can compensate for the additional load of the newly activated way-group, at which point, the power controller may send a signal indicating that it is safe for the way-group to resume operation.

While power is returning, the way-group may be locked (block 805). Accesses to the way-group being powered up may be prevented until the power up process has completed. In some embodiments, a power controller, or other such functional circuit block, may signal control circuitry once the way-group is ready to operate. Once the way-group has been unlocked, a power event timer may be reset (block 806). In various embodiments, the power event timer may include one or more counters or other sequential logic circuits used to track a period of time or a number of processing cycles during which power transitions may occur.

Once the power event timer has been reset, hit and miss counters, such as, e.g., LRU 510, and MISS 511 as illustrated in FIG. 5, may be reset (block 807). With the hit and miss counters reset, the cache memory is ready for continued operation, and the method may then conclude in block 808. By powering up a way-group, the computing system may, in some embodiments, provide additional cache storage capacity, thereby improving processing performance at the expense of additional leakage and dynamic power. It is noted that the flowchart depicted in FIG. 8 is merely an example. In other embodiments, different operations, and different orders of operations are possible and contemplated.

Figure 9:
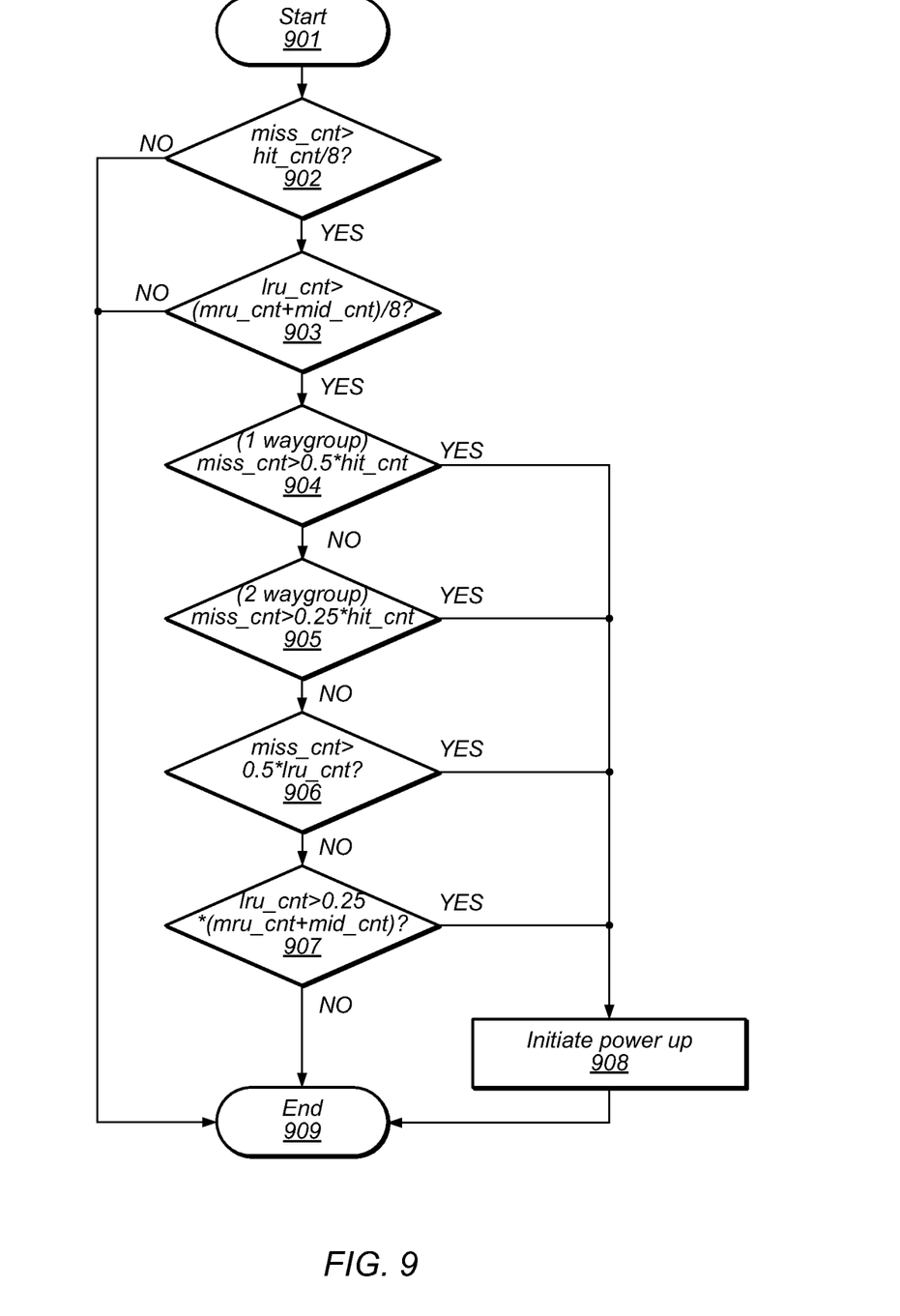
FIG. 9 illustrates a flow diagram of an embodiment of a method for detecting a power up condition for a cache memory.

A flowchart depicting an embodiment of a method for checking conditions necessary to power up a portion of a cache memory is illustrated in FIG. 9. In various embodiments, the method illustrated in FIG. 9 may correspond to blocks 802 and 803 of the flowchart of FIG. 8. Referring collectively to FIG. 5 and the flowchart illustrated in FIG. 9, the method begins in block 901. The method may then depend on value of MISS counter 511 and a hit count (block 902). In some embodiments, the hit count may be determined by using the values of MRU counter 508, MID counter 509, and LRU counter 510.

When the value of MISS counter is less than or equal to the hit count divided by eight, the method may conclude in block 909. It is noted that while the hit count is scaled by a factor of eight, in other embodiments, different scaling factors, including no scaling, may be employed.

If the value of the MISS counter is greater than the hit count divided by eight, the method may then depend on a comparison between various hit counters (block 903). When a value of the LRU counter 510 is less than or equal to the sum of values of MRU counter 508 and MID counter 509 divided by eight, the method may conclude in block 909. It is further noted that combination of values of MRU counter 508 and MID counter 509 is merely an example. In other embodiments, different algorithms are possible and may be changed dynamically dependent upon overall system performance.

If the value of the LRU counter 510 is greater than the sum of values of MRU counter 508 and MID counter 509 divided by eight, then the method may depend on the value of MISS counter 511 and the hit count (block 904). If a single way-group has been powered down, and the value of MISS counter 511 is less than or equal to half of the hit count, a power up may be initiated on the powered down way-group (block 908). In various embodiments, the initiation of the power up may involve one or more of the operations described in blocks 804 through 807 of the flowchart of FIG. 8. Once the determination has been made to initiate a power up of the powered down way-group, the method may conclude in block 909.

If the value of MISS counter 511 is greater than half of the hit count, then the method may again depend on the value of MISS counter 511 and the hit count (block 905). If two way-groups have been powered down, and the value of MISS counter 511 is less than or equal to a quarter of the hit count, the method may proceed as described above from block 908. If, however, the value of MISS counter 511 is greater than or a quarter of the hit count, the method may then depend on a comparison between the value of MISS counter 511 and LRU counter 510 (block 906).

When the value of MISS counter 511 is less than or equal to half of the value of LRU counter 510, then the method may proceed as described above from block 908. If the value of MISS counter 511 is greater than half of the value of LRU counter 510, then the method may depend on the values of the individual hit counters (block 907).

If the value of LRU counter 510 is less than or equal to one quarter of the sum of the values of MRU counter 508 and MID counter 509, then the method may proceed as described above from block 908. Alternatively, if the value of LRU counter 510 is greater than one quarter of the sum of the values of MRU counter 508 and MID counter 509, then the method may conclude in block 909. It is noted that the relationship between the values of hit counters described in regard to block 907 is merely an example. In other embodiments, different comparisons between the various hit counter values may be performed.

The operations illustrated in the flowchart of FIG. 9 are depicted as being performed in a serial fashion. In other embodiments, one or more of the operations may be performed in parallel.

Figure 10:
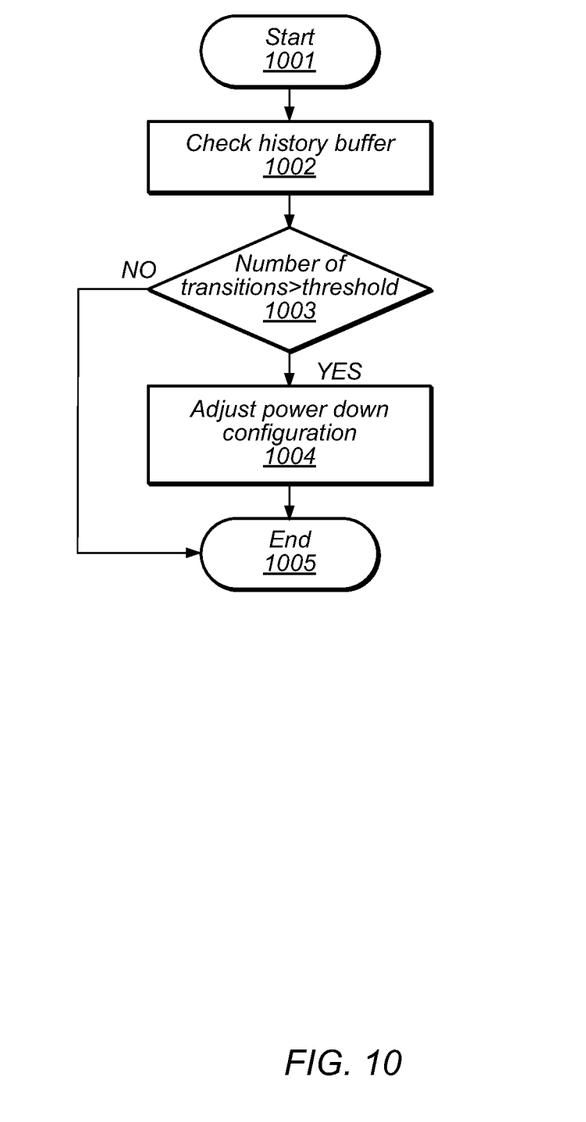
FIG. 10 illustrates a flow diagram of an embodiment of a method for adjusting a power down configuration.

Turning to FIG. 10, a flowchart depicting an embodiment of a method for adjusting a power down configuration is illustrated. The power down configuration may relate to the settings and calculations used to detect a power down condition in a cache memory, such as, L2 cache 210 as illustrated in FIG. 2, for example. For example, a cycle threshold, such as, e.g., the cycle threshold mentioned in block 702 of the flowchart illustrated in FIG. 7, may be modified. In some embodiments, altering the power down configuration may allow the use of one or more alternate methods to that depicted in the flowchart of FIG. 7.

The method begins in block 1001. A history buffer may then be checked (1002). Each time a transition, either up or down, is made from one power state to another for a given cache memory, information relating to the transition may be stored in the history buffer. For example, the values of the hit and/or miss counters, may be stored along with a time the transition occurred. The history buffer may, in various embodiments, be a dedicated buffer located within processor complex 208. Alternatively, the buffer may be a reserved portion of main memory used to store the aforementioned running history of power transitions.

The method may then depend on the number of power transitions stored in the history buffer (block 1003). In some embodiments, if the number of power transitions is greater than a predetermined threshold, the power down configuration may be adjusted to be more restrictive (block 1004). For example, if within 50 million cycles, the number of power transitions exceeds the predetermined threshold, the power down configuration may be made more restrictive by increasing a threshold used in the power down determination by a factor of two. Once the power down configuration has been adjusted, the method may then conclude in block 1005.

If the number of power transitions if is less than or equal to the predetermined threshold, the method may then conclude in block 1005. It is noted that the flowchart depicted in FIG. 10 is merely an example. In other embodiments, different operations and different orders of operations are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a cache memory, wherein the cache memory includes a plurality of groups, wherein each group of the plurality of groups includes a plurality of cache ways, and wherein each cache way of the plurality of cache ways includes a plurality of cache lines;
   circuitry coupled to the cache memory, wherein the circuitry is configured to:
   for a threshold number of cycles, determine a number of accesses to the cache memory;
   if the number of accesses to the cache memory is greater than zero:
   perform a comparison between a first number of access to a first group of cache lines and a second number of access to a second group of cache lines, wherein a particular cache line included in the second group of cache lines occupies a least recently used position greater than a respective least recently used position of each cache line included in the first group of cache lines;

detect a power down condition for the cache memory dependent upon the comparison;

otherwise detect the power down condition;

select, in response to a detection of the power down condition, a particular group of the plurality of groups dependent upon a number of cache lines in each cache way of the plurality of cache ways in each group of the plurality of groups that are also included in another cache memory; and lock the particular group; and a flush engine configured to flush each cache line of each cache way of the plurality of cache ways of the particular group; and wherein the circuitry is further configured to activate a power down mode for the particular group in response to a determination that each cache line of each cache way of the plurality of cache ways of the particular group has been flushed.

2. The apparatus of claim 1, wherein to select the particular group of the plurality of groups, the circuitry is further configured to determine a number of hits for each group of the plurality of groups.

3. The apparatus of claim 2, wherein to select the particular group of the plurality of groups, the circuitry is further configured to select the particular group of the plurality of groups dependent upon the number of hits for each group of the plurality of groups.

4. The apparatus of claim 1, wherein to flush the particular group, the flush engine is further configured to wait a number of processing cycles after issuing a first flush request for a first cache line in a given cache way of the plurality of cache ways included in the particular group before issuing a second flush request for a second cache line in the given cache way of the plurality of cache ways included in the particular group.

5. The apparatus of claim 1, wherein the circuitry is further configured to detect a power up condition for the cache memory dependent upon a number of misses for the cache memory.

6. The apparatus of claim 5, wherein the circuitry is further configured to select, in response to the detection of the power up condition, a particular powered down group from one or more powered down groups.

7. A method for operating a cache memory, wherein the cache memory includes a plurality of groups, wherein each group of the plurality of groups includes a plurality of cache ways, and wherein each cache way of the plurality of cache ways includes a plurality of cache lines, the method comprising:

for a threshold number of cycles, determining a number of accesses to the cache memory;

if the number of accesses to the cache memory is greater than zero:

performing a comparison between a first number of accesses to a first group of cache lines and a second number of accesses to a second group of cache lines, wherein a particular cache line included in the second group of cache lines occupies a least recently used position greater than a respective least recently used position of each cache line included in the first group of cache lines;

detecting a power down condition for the cache memory dependent upon the comparison;

otherwise detecting the power down condition;

selecting, in response to the detection of the power down condition, a particular group of the plurality of groups dependent upon a number of cache lines in each cache way of the plurality of cache ways in each group of the plurality of groups that are also included in another cache memory;

locking the particular group;

flushing the particular group; and activating a power down mode for the selected set of cache ways in response to a determination that the particular group has been flushed.

8. The method of claim 7, wherein selecting the particular group of the plurality of groups comprises determining a number of hits for each group of the plurality of groups.

9. The method of claim 8, wherein selecting the particular group of the plurality of groups further comprises selecting the particular group dependent upon the number of hits for each group of the plurality of groups.

10. The method of claim 7, wherein flushing the particular group comprises waiting a number processing cycles after issuing a first flush request for a first cache line in a given cache way of the plurality of cache ways included in the particular group before issuing a second flush request for a second cache line in the given cache way of the plurality of cache ways included in the particular group.

11. The method of claim 7, wherein selecting the particular group of the plurality of groups comprises selecting the particular group of the plurality of groups after a period of time has elapsed since the detection of the power down condition.

12. The method of claim 7, further comprising detecting a power up condition for the cache memory dependent upon a number of misses for the cache memory.

13. A system, comprising:

a processor;

a cache memory coupled to the processor, wherein the cache memory includes a plurality of groups, wherein each group of the plurality of groups includes a plurality of cache ways, wherein each cache way includes a plurality of cache lines; and circuitry coupled to the cache memory, wherein the circuitry is configured to:

for a threshold number of cycles, determine a number of accesses to the cache memory;

if the number of accesses to the cache memory is greater than zero:

perform a comparison between a first number of accesses to a first group of cache lines and a second number of accesses to a second group of cache lines, wherein a particular cache line included in the second group of cache lines occupies a least recently used position greater than a respective least recently used position of each cache line included in the first group of cache lines;

detect a power down condition for the cache memory dependent upon the comparison;

otherwise detect the power down condition;

select, in response to a detection of the power down condition, a particular group of the plurality of groups dependent upon a number of cache lines in each cache way in the plurality of cache ways in each group of the plurality of groups that are also included in another cache memory;

lock the particular group;

flush the particular group; and activate a power down mode for the selected one of the plurality of groups responsive to a determination that the particular group has been flushed.

14. The system of claim 13, wherein to select the particular group of the plurality of groups, the circuitry is further configured to determine a number of hits for each group of the plurality of groups.

15. The system of claim 14, wherein to select the particular group of the plurality of groups, the circuitry is further configured to select the particular group of the plurality of groups dependent upon the number of hits for each group of the plurality of groups.

16. The system of claim 13, wherein to flush the particular group, the circuitry is further configured to wait a number of processing cycles after issuing a first flush request for a first cache line in a given cache way of the plurality of cache ways included in the particular group before issuing a second flush request for a second cache line in the given cache way of the plurality of cache ways included in the particular group.

17. The system of claim 13, wherein the circuitry is further configured to detect a power up condition for the cache memory.

18. The system of claim 17, wherein to detect the power upon condition for the cache memory, the circuitry is further configured to determine a number of misses for the cache memory.

* * * * *